April 26, 1966 W. S. THOMAS, JR., ET AL 3,248,737

SELF-STABILIZING MECHANICAL SYSTEM

Filed May 10, 1961

INVENTORS.
WALTER S. THOMAS JR.
DAVID G. ADLER
RAYMOND J. STANKIEWICZ

BY William E. Cleaver
ATTORNEY

United States Patent Office 3,248,737
Patented Apr. 26, 1966

3,248,737

SELF-STABILIZING MECHANICAL SYSTEM

Walter S. Thomas, Jr., and David G. Adler, Drexel Hill, and Raymond J. Stankiewicz, Philadelphia, Pa., assignors to Sperry Rand Corporation, New York, N.Y., a corporation of Delaware Filed May 10, 1961, Ser. No. 109,222
3 Claims. (Cl. 346—74)

This invention relates to self-stabilizing mechanical systems and more particularly to a self-adjusting device for positioning a movable member into close proximity with a stantionary member.

In the magnetic recording art, it is well recognized that optimum performance, with respect to reading, writing and erasing, is obtained when the magnetic transducer head is positioned as close as possible to the surface of the magnetic record. In positioning the transducer head as close as possible certain difficulties are encountered. For instance, if the system is to be designed for minimum wear the transducer head should not be positioned such that it rides against or comes into physical contact with the surface of the magnetic record and therefore, if the transducer head is firmly positioned with respect to a rotating disk or drum, the disk or drum must rotate with no eccentric movement or no deviation from its axis. In order to attain such "true" rotation, the drum or the disk must be very precisely mounted.

Since precision mountings are costly, some attempt has been made to provide a transducer head mounting piece which can be physically adpusted with respect to the magnetic record or the rotating disk. For instance, transducer head mounting pieces have been attached to metal straps which can be formed or bent and thereafter the metal straps have been adjusted to locate the transducer heads in close proximity to the rotating disk (magnetic record). Obviously such an arrangement has undesirable aspects, for instance, the practical limits of adjusting a plurality of heads in equal relationship to the magnetic record and the realignment of the mounting pieces whenever one magnetic record is interchanged with another magnetic record.

Accordingly, it is an object of the present invention to provide an improved self-adjusting mechanical system for positioning one member relative to another member.

It is a further object of the present invention to provide a system which enables a first movable member to be positioned in close proximity to a second member with relatively little precision-mounting effort required.

It is another object of the present invention to provide a mechanical system which is self-actuating and self-regulating while positioning one member relative to another member.

It is another object of the present invention to provide a mechanical system which is self-adjusting while positioning one member relative to another and which has a relatively high level of dynamic stability.

In accordance with a feature of the present invention, at least two members of the system are particularly formed and relatively disposed with respect to each other to provide an interspace between them, such that when one member rotates relative to the other member a partial vacuum is formed, which in turn tends to cause the two members to move toward each other.

In accordance with another feature, at least one of the two last-mentioned members is movably mounted so that in response to said partial vacuum the movable member (or members) can actually be moved toward the other member (or toward each other).

In accordance with another feature a cutout is provided in at least one of the two members which primarily enables a locking means, such as a nut, to fit in the cutout and thereby not inhibit the close positioning of the two members. The cutout can be a means of regulating the positioning of the two members since the diameter of this cutout determines the dynamic gap which is in effect between the two members during the rotational movement of one member relative to the other.

Figure 1:
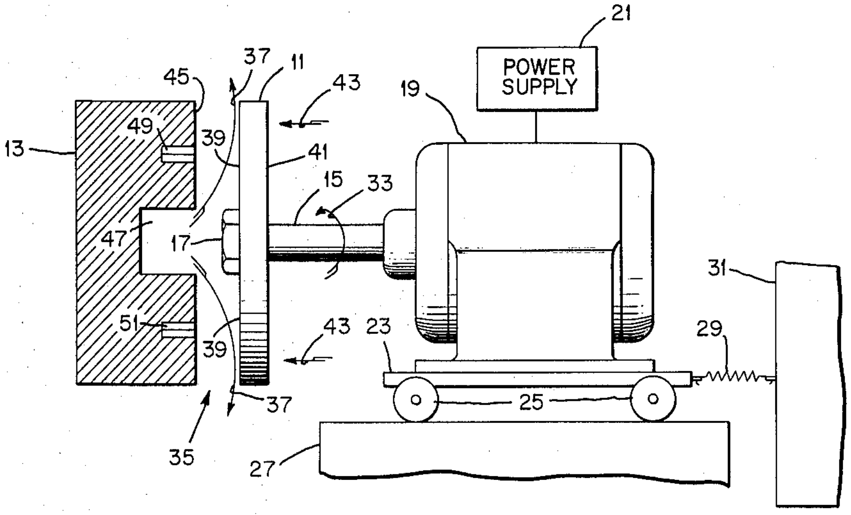
FIGURE 1 is a partial sectional and pictorial schematic of an embodiment of the present invention.

If a body or member is rotated while being emersed in a fluid, the fluid coming in contact with the body surface adopts the rotational movement of the body by virtue of the frictional drag between the body surface and the fluid. When the rotating body has attained sufficient velocity the momentum of the fluid will cause it to leave the surface of the rotating body in a tangential direction providing a partial vacuum thereat. This pumping action creates a differential of pressure between the surface of the rotating body wherefrom the fluid has been pumped and the remaining emersed surface. If the rotating body is movable, there will be a tendency to move it toward the low pressure or vacuum surface in accordance with the pressure differential. The application of this principle can be better understood from the following description of the figures Consider FIGURE 1 wherein a rotating disk or body 11 is shown disposed opposite a stationary body or magnetic head mounting device 13. For purposes of illustration, consider that the rotating disk 11 and stationary body 13 are emersed in air, although it should be understood that the present invention might well be used with some other fluid medium such as oil, etc. In FIGURE 1, disk 11 can be considered to be a magnetisable recording disk which is secured to the shaft 15 by virtue of the nut 17. The shaft 15 is driven by the motor device 19 which is connected to the power source 21. Further, consider in FIGURE 1 that the motor device 19 is mounted on a support plate assembly 23 which is equipped with frictionless wheels 25. The motor and support plate assembly 23 are depicted in FIGURE 1 as being mounted on the surface 27. Further, the support plate is connected to spring 29 which in turn is fastened to stationary means 31 which provides a positive return movement of the motor 19 with the support assembly 23 toward the right hand side.

When the motor 19 is energized from the power source 21 it drives the shaft 15 and therefore recording disk 11, as shown by the motion arrow 33. As the magnetic recording disk 11 rotates, it pumps air from the interspace 35 as shown by the air-flow arrows 37. In accordance with the principle of fluid pumping described above the movement of the air, in the direction of the air-flow arrows 37, creates a partial vacuum at the inside surface 39 of the disk 11.

The partial vacuum at the surface 39 gives rise to a pressure differential between surfaces 41 and 39 of disk 11. As shown by the force-arrow 43 the surrounding atmosphere provides a net positive pressure against the surface 41 which tends to push the disk 11 toward the stationary member 13. Since for purposes of illustration it has been suggested that the motor support assembly is mounted on frictionless wheels the net positive pressure against the surface 41 will cause the entire support assembly 23 and motor 19 to move toward the stationary member 13. Initially the assembly may be disposed so that the rotating disk is sufficiently far from the stationary member to prevent contact therebetween if a surging movement should occur when the motor starts to rotate and pass through critical speeds.

It should be noted here that in actual practice the movable characteristic of the motor support assembly is made possible by other means in addition to the virtually frictionless wheels. In one embodiment the support plate, similar to plate 23, is mounted or hung by leaf springs from a surface which is parallel to plate 23 and this enables the movement of the motor assembly to be effected with virtually no frictional drag. In addition the spring return force is inherently provided by the leaf springs in conjunction with gravity.

Figure 2:
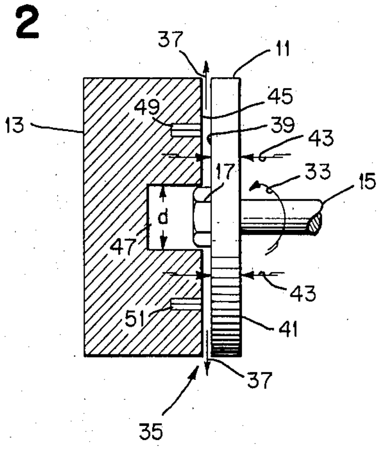
FIGURE 2 is a partial sectional view of a portion of FIGURE 1 showing a movable member disposed in close proximity to a stationary member.

In FIGURE 2 the rotating magnetic disk 11 is shown in close proximity to the stationary body 13. As the rotating disk 11 approaches the stationary body 13 the layer of air in the interspace 35 reduces until there is not only a significant friction drag from the inside surface 39 of the disk 11 but also from the inside surface 45 of the stationary member 13. Air molecules are believed to be partially trapped at the surface mounts and will greatly resist being moved out. In addition shear effect of the air in the interspace causes the remaining layer of air to increase in temperature and expand so as to increase the width of the cushion. The expanded cushion prevents the rotating disk from being moved physically into contact with the stationary device 13. The principle of the thermally expanding air in the interspace as just described is similar to that which has been observed with parallel-face thrust bearings as described in the textbook "Analysis in Lubrication of Bearings" by Messrs M. C. Shaw and E. F. Macks published by McGraw-Hill, 1949.

Although in FIGURE 2 the interspace is depicted as being large enough to be visibly detected, under actual dynamic conditions the interspace 35 is in the order of one mil or $\frac{1}{1000}$ of an inch. Initially the disk is located approximately 25 mils. from the stationary plate 13 before power is applied. It will be noted in FIGURES 1, 2 and 3 that there is a circular cutout 47 in the stationary body 13. This cutout enables the nut 17 to fit therein and thereby not impede the close positioning of the disk 11 wih respect to the stationary body 13. It should be readily understood that the disk 11 might well be secured to the shaft 15 by some means other than nut 17. In such circumstances the cutout would not be necessary and its absence would not detract from the operation of the invention. On the other hand it has been observed that the cutout 47 can be used as a regulatory feature of the present invention. For example, if the diameter of the cutout is enlarged the dynamic gap 35 becomes wider at the time that disk 11 is finally cushioned. This last described phenomenum is in accordance with the pumping action described above. If there is a greater reservoir of air provided by an enlarged diameter cutout 47 there will not be as great a vacuum developed in the interspace and therefore the differential of pressure between the surfaces 41 and 39 will be less. FIGURES 1 and 2 further depict three reading heads 49 and 51 which indicate that the magnetic disk 11 is a multiple track disk. Although it is not shown, it should be clearly understood that many more than three reading heads may be employed and that sufficient read-out circuitry is provided in conjunction with these reading heads to make a utilization complete.

Figure 3:
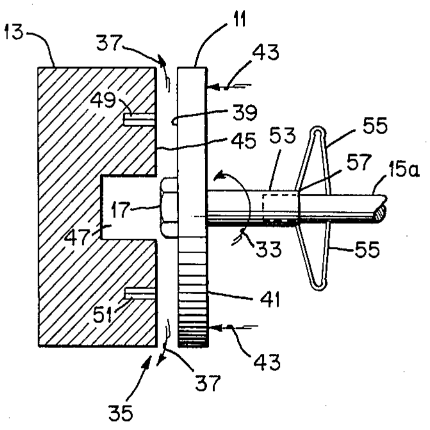
FIGURE 3 is a partial sectional view of a portion of a second embodiment of the present invention.

FIGURE 3 shows a second embodiment of the present invention, primarily to illustrate that many embodiments may be employed and the invention may be utilized in a variety of ways. In FIGURE 3 the magnetic disk 11 is shown mounted on a hollow shaft 53. The hollow shaft 53 fits over the shaft 15*a* which is analogous to the shaft 15 of FIGURES 1 and 2 and can be considered connected to a driving source such as motor 19. The hollow shaft 53 is supported and connected to shaft 15*a* by virtue of the hair-pin springs 55. As shaft 15*a* is rotated, its rotation is imparted to the hollow shaft 53 by the hair-pin springs 55 thus causing the disk 11 to rotate. The hair-pin springs 55 provide a frictionless support thereby enabling hollow shaft 53 to slide axially along shaft 15*a*. When the driving shaft 15*a* is rotating as shown by the arrow 33 the magnetic disk 11 is likewise rotated and the net positive force 43 against the surface 41 moves the disk 11 and the hollow shaft 53 toward the stationary body 13. The returning action is accomplished by the leaf springs 55 which will pull the hollow shaft 53 and therefore the disk 11 toward the right hand side along the shaft 15*a* when the pressure differential developed by the speed of the disk 11 no longer overcomes the pulling force of the hair-pin springs 55.

While the embodiments of the invention describd thus far have been described in connection with a magnetic disk and a magnetic head mounting device, it should be obvious that the invention may well be used in other ways such as a rotational speed measuring device, governor, etc. For instance, if a spring loaded mechanical arm were positioned to rest against the surface 57 (FIG. 3) and this mechanical arm were the wiper device on a potentiometer, the movement of the hollow shaft 53 would enable the wiper to assume significant positions on the potentiometer surface and with a properly connected electrical device the rotational speed of the disk 11 could easily be detected and/or regulated. Other forms of detecting means could be used. For instance, a jet device could be disposed in close proximity to the surface 41 of disk 11. If a jet of air were projected to surface 41 the difference in back pressure could be measured as the disk moved axially along shaft 15*a* thereby enabling the speed of rotation to be detected.

While we have described above the principles of our invention in connection with specific apparatus, it is to be clearly understood that this description is made only by way of example, and not as a limitation of the scope of our invention as set forth in the objects thereof, and in the accompanying claims.

We claim:

1. An aerodynamically stabilized magnetic recording system comprising: a transducer head stationary mounting means, a magnetizable recording disk entirely formed of rigid material to prevent any vibrating movement when rotated, disposed substantially parallel to said mounting means along a vertical plane and in close proximity thereto, thereby forming an interspace therebetween when said magnetizable recording disk is at rest; supporting means connected to said recording disk to enable said disk to move along the direction of its axis, said supporting means including driving means to rotate said disk about its axis at a relatively high speed thereby imparting a radial movement to the air in said interspace thus causing a pressure differential between the air in said interspace and the atmosphere surrounding said disk, whereby said disk and said supporting means including said driving means are moved towards said transducer head mounting means; and return action means connected to said supporting means to cause said supporting means and therefore said magnetizable recording disk to move horizontally away from said mounting means in response to the rotational speed of said disk being decreased.

2. An aerodynamically stabilized magnetic recording system according to claim 1 wherein said recording disk is coupled to said driving means by virtue of a locking means which protrudes from the surface of said disk into said interspace; and wherein said transducer-head mounting means includes a matching cutout for said locking means thereby enabling said disk to be disposed in close proximity to said mounting means without being impeded by said locking means.

3. An aerodynamically stabilized magnetic recording system comprising in combination: a transducer-head stationary mounting means; a magnetizable recording disc, formed of rigid material to prevent any vibrating movement when rotated and disposed substantially parallel to said mounting means and in close proximity thereto, thereby forming an interspace therebetween when said magnetizable recording disc is at rest; motor means connected to said recording disc to rotate said disc about its axis at a relatively high speed thereby imparting radial movement to the air in said interspace thus causing a pressure differential between the air in said interspace and the atmosphere surrounding said disc whereby said disc is urged toward said transducer-head mounting means; and substantially frictionless supporting means connected to said motor means to provide support and to enable said motor and said disc to move toward and away from said transducer-head mounting means in response to said pressure differential.

References Cited by the Examiner

UNITED STATES PATENTS

| | | | |
|---|---|---|---|
| 2,937,804 | 5/1960 | Reiner | 308—9 |
| 2,950,353 | 8/1960 | Fomenko | 179—100.2 |

FOREIGN PATENTS

| | | |
|---|---|---|
| 1,119,186 | 4/1956 | France. |

OTHER REFERENCES

Pages 2–4, August 1957, Farrand, W. A.: An Air-Floating Disk Magnetic Memory Unit. An address delivered at the Western Electronic Show and Convention.

May 24, 1960, Bernoulli Disk. Flyer of Laboratory for Electronics, Inc. 4 pages.

Pages 164–5, January 1961, Pearson, R. T.: The Development of the Flexible-Disk Magnetic Recorder. Proceedings of the I.R.E. 49:1.

IRVING L. SRAGOW, *Primary Examiner.*

ELI J. SAX, *Examiner.*

M. K. KIRK, *Assistant Examiner.*